United States Patent
Tahincioglu

(10) Patent No.: US 9,534,342 B2
(45) Date of Patent: Jan. 3, 2017

(54) LOW-FRICTION, ABRASION RESISTANT AND EASY-TO-CLEAN COMPOSITE IRON SOLE PLATE

(75) Inventor: Besim Tahincioglu, Kocaeli (TR)

(73) Assignee: EKSEN MAKINE SANAYI VE TICARET A.S., Gebze, Kocaeli (TR)

( * ) Notice: Subject to any disclaimer, the term of this patent is extended or adjusted under 35 U.S.C. 154(b) by 0 days.

(21) Appl. No.: 14/398,215

(22) PCT Filed: May 3, 2012

(86) PCT No.: PCT/EP2012/058111
§ 371 (c)(1),
(2), (4) Date: Oct. 31, 2014

(87) PCT Pub. No.: WO2013/164028
PCT Pub. Date: Nov. 7, 2013

(65) Prior Publication Data
US 2015/0135563 A1  May 21, 2015

(51) Int. Cl.
*D06F 75/38* (2006.01)
*C09D 183/04* (2006.01)
*C23C 18/12* (2006.01)

(52) U.S. Cl.
CPC .............. *D06F 75/38* (2013.01); *C09D 183/04* (2013.01); *C23C 18/122* (2013.01); *C23C 18/1212* (2013.01); *C23C 18/1216* (2013.01); *C23C 18/1254* (2013.01); *Y10T 428/31663* (2015.04)

(58) Field of Classification Search
CPC .. D06F 75/38; C23C 18/1208; C23C 18/1216; C23C 18/122; C23C 18/1254; B32B 9/04; B32B 9/0945; B32B 11/08; B32B 15/01; B32B 18/00; B05D 1/00; B05D 1/02; Y10T 428/31663; C09D 183/04
See application file for complete search history.

(56) References Cited

U.S. PATENT DOCUMENTS

| | | | | |
|---|---|---|---|---|
| 5,592,765 A * | 1/1997 | Oomen | .................... | D06F 75/38 38/93 |
| 5,718,753 A * | 2/1998 | Suzuki | .................... | B82Y 30/00 106/403 |
| 6,000,157 A * | 12/1999 | De Beurs | ................ | D06F 75/38 38/93 |
| 7,247,350 B2 * | 7/2007 | Sepeur | .................... | C08G 77/02 427/162 |

(Continued)

FOREIGN PATENT DOCUMENTS

DE 102010011185 A1 9/2011
EP WO2010072814 A1 7/2010

*Primary Examiner* — Ismael Izaguirre
(74) *Attorney, Agent, or Firm* — Epstein Drangel LLP; Robert L. Epstein

(57) ABSTRACT

The present invention relates to a composite iron sole plate coated using sol-gel process with hydrolysis and condensation products of silanes with a metal precursor. The selected silanes are MTEOS and TEOS which give improved and tailored coatings for iron sole plates along with a metal precursor. The invention also relates to a novel method of producing iron sole plates having this coating, as well as an iron having such sole plate. The coating composition, when applied to an iron sole plate, found to be improving surface characteristics in terms of low friction, abrasion resistance, shine prevention and ease of cleaning due to its chemical stability and flatness.

19 Claims, 3 Drawing Sheets

(56) References Cited

U.S. PATENT DOCUMENTS

| | | | |
|---|---|---|---|
| 2005/0247915 A1 | 11/2005 | Cnossen et al. | |
| 2010/0178491 A1 | 7/2010 | Mennig | |
| 2011/0111239 A1* | 5/2011 | Dandekar | A47J 36/02 |
| | | | 428/469 |
| 2015/0357204 A1* | 12/2015 | Ogihara | H01L 21/32135 |
| | | | 438/703 |

* cited by examiner

LOW-FRICTION, ABRASION RESISTANT AND EASY-TO-CLEAN COMPOSITE IRON SOLE PLATE

TECHNICAL FIELD OF THE INVENTION

The present invention relates to an iron sole plate having improved surface characteristics. The invention particularly relates to an iron sole plate having a silane-based coating layer for improving friction, abrasion and other desirable properties of the plate material.

BACKGROUND OF THE INVENTION

Improving surface properties of iron sole plates for ensuring more comfortable ironing has always been a challenge in the relevant industry. For improving the surface properties, various coating materials such as Al—TiN, Teflon®, ferrous alloys, and other inorganic materials such as silanes and various ceramics have been proposed in the current state of the technical field. Al—TiN and Teflon, inter alia became preferable coatings for iron sole plates with allegedly low friction and non-sticking properties. It is well known in the art that these materials are applied to the external surface of the sole plates by various techniques such as PVD, CVD, spray coating and dip coating.

The present invention provides an alternative iron sole plate having a silane based coating layer which is advantageously produced by way sol-gel techniques. The inventive iron sole plate according to the invention is noted to be at least comparable with state of the art sole plates, and showing considerably improved characteristics in terms of cleaning, friction, fabric protection etc.

Sol-gel concept is known as a process comprising typically application of hydrolysable precursors such as oxides and alkoxides and a following heat treatment to obtain mechanically stable coating material with an enhanced density and hardness.

A coating method for glass, ceramic and metal surfaces using sol-gel technique aiming alkali-resistance, wear-resistance and dishwasher-safety for household, specifically kitchen appliances is introduced by the application WO 2010-072814-A1. The document explains a composite coating system applied on a metal surface to be protected, which are preferably aluminum and/or its alloys. The coating requires a porous base, which is an oxide layer, e.g. aluminum oxide layer established on the metallic base which is made of aluminum and/or its alloys. The said oxide layer is to be coated with two additional layers which require repetitive applications and heat treatments including cooling to the room temperature. First of them contains polydimethyl siloxane (PDMS) to obtain an elastic base to the second layer, which contains alkali metal compounds for alkali resistance. All those interlayers require additional process steps with their own costs including time-costs. Besides, this document is not concerned in acquiring low-friction and cleaning convenience at iron sole plates, instead the main concern of this document is stressed as chemical resistance by surfaces subjected to especially alkaline liquids.

Iron sole plates coated with sol-gel method is known per se by applications EP 0 998 604 B1 and US 2003/0074814 A1. Both of these documents explain methods using a plurality of coating layers applied to metal surfaces. Besides, the metallic base to be coated in both methods is essentially aluminum and/or its alloys, which requires a hard interlayer between the final coating layer and the base material itself. Therefore an oxide layer was employed as the interlayer, which means an additional process step with its own costs.

An iron sole plate which is made of aluminum and/or its alloys and coated using sol-gel method is presented in the document U.S. Pat. No. 6,901,687. This document does not clearly report the ingredients of coating solution, which also requires a porous aluminum oxide layer prior to the application of the liquid mixture. The dry thickness of the coating is 30-40 µm, which could readily cause potential cracks because of the great potential with inner tensions along this thick matrix.

An iron sole plate has its specific requirements to be used for a long lifespan without major problems. It is preferred for an iron sole plate to have an ironing surface with a rather high hardness which protects the sole plate from abrasive damages. Additionally, an iron sole plate should preferably cause low friction forces, thus a comfortable use during ironing. Moreover, because ironing is a high temperature application, there arises another expectation from an iron sole plate to have easy-to-clean properties due to accidental contamination of molten synthetic fabric materials which may stick, burn and cause burnt stains on the surface of the sole plate. The major objectives given hereinabove may generally be obtained by coating desired materials to the base surface. It is therefore, highly important for the industry of household appliances to have a coating composition that is applicable not only to limited kind of base materials (e.g. aluminum or aluminum alloys) but also other metallic structures such as stainless steel.

Objects of the Invention

A primary object of the present invention is to provide a low-friction, abrasion resistant iron sole plate which is easy-to-clean.

Another object of the present invention is to provide a method for producing low-friction, abrasion resistant iron sole plates which is simple and cost effective by virtue of a monolayer coating with minimum process steps.

A further object of the present invention is to provide a method for producing an iron sole plate having a glass-like coating wherein the need for an additional oxide layer is eliminated.

Another object of the present invention is to provide a method for producing iron sole plates with glass coating, which coating is applicable to wide range of metallic base materials.

Still a further object of the present invention is to provide an ironing appliance including the base material of the invention.

SUMMARY OF THE INVENTION

The present invention proposes an iron sole plate for domestic or industrial purposes, and specifically an iron sole plate coated with an inorganic polymer using a sol-gel process.

More specifically, the invention pertains to an iron sole plate comprising a base material having an ironing surface, and a coating layer covering said ironing surface wherein the coating is a hydrolysis and polycondensation product of a composition comprising the following:
  methyl triethoxy silane (MTEOS),
  tetraethoxy silane (TEOS),
  a metal precursor, and
  water.

In preferred embodiments, said composition further comprises an alkali hydroxide, more preferably KOH as a base catalyst. The inventors also noted that a metal precursor which is an alkoxide or hydroxide of Cesium makes positive contribution to mechanical properties of the final coating. Among these CsOH is particularly preferred.

The sol composition for use in preparation of the iron sole plate according to the present invention may further comprise an alcohol for solution homogeneity as a co-solvent.

The said sole plate lacks any interlayer between the inorganic polymer coating and the metallic base surface; metallic base surface and inorganic polymer coating are in direct contact with each other without requiring an additional porous layer for proper adhesion.

DETAILED DESCRIPTION OF THE INVENTION

Hydrolyzable silicon compounds comprising at least one non-hydrolyzable moiety, preferably monoalkyl silanes, build a condensate network with other silicon compounds which do not comprise any non-hydrolyzable moieties. The coating composition as prepared for producing the iron sole plates of the present invention may be a condensation product of two groups of silanes. The first party of reacting compounds, which is a hydrolyzable silane compound comprises at least one non-hydrolyzable moiety, such as one of monoalkyl silanes, namely by methyl triethoxy silane (MTEOS). The second party of reacting compounds does not comprise any non-hydrolyzable moieties, because all of the moieties are to be hydrolyzable.

Polycondensation products of the silanes having different number of functional groups according to the present invention are prepared in the presence of an alkoxide or hydroxide of Cesium as precursor, whereas various metal alkoxides, metal salts or metal hydroxides may additionally be included as additional precursors. The inventors noted that Cesium compounds as precursor materials give best results for obtaining the desirable abrasion resistance and easy-to-clean properties in the sole plate of the present invention. In the context of the present invention the cesium compound is preferably CsOH. It was noted also that Cs compounds give good performance in adhering to base materials (sole plate) other than aluminum based materials such as stainless steel.

The hydrolysis and polycondensation reactions, as well known in the art with generic name of "sol-gel" can be catalyzed by suitable reagents. The method of the present invention preferably involves a sol-gel procedure which is base catalyzed, preferably by alkali hydroxides, and more preferably by KOH.

Figure 1:
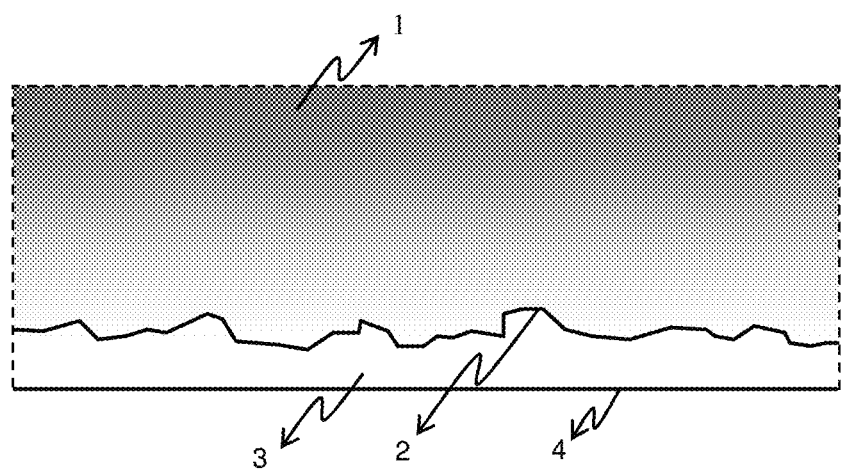
FIG. 1 is a nano-scale drawing demonstrating a close view of the cross section of the layers of a sole plate according to the present invention.

Referring now to FIG. 1, the iron sole plate according to the present invention comprises a metallic base (1) and a coating (3) which is mainly transparent and may present a color among the grayscale depending on the existence and/or proportions of the colorants. The surface of the metallic basis (1) is subjected to roughening by means of sand blasting or any other convenient method serving the same technical purpose of forming cavities (2) which supply rather firm grabbing points for the coating (3). The base material constituting the sole plate consists of a metal or its alloys, preferably made of aluminum or stainless steel. It has the physical shape of an iron sole plate which is hereby not described and shown in detail. However, as conventionally known, it technically constitutes the main body of the heated part of an iron. Yet, the properties expected from an iron sole plate, can be summarized as low friction, resistance against abrasion, chemical stability against detergent residues on fabrics and ease of cleaning when in case of being subjected to molten synthetic fabrics. Low friction sole plate surfaces make ironing an easier task, and they also help maintaining the iron shine. Adherence of the coating (3) to base material is of critical importance as it determines degree of scratches (i.e. abrasion resistance) on the base material surface after a period of use. The coating is also expected to provide the desired properties in operation temperatures of iron (i.e. 180-220° C.) without deterioration in coating quality. As stressed with the figure, the final coating (3) represents a very flat solid surface (4) which conjugates with the metallic basis (1) by filling and grabbing the pre-formed cavities (2).

The color of the iron sole plate according to the present invention may be adjusted by way of colorants in specific amounts. The preferred colorants are typically selected from $TiO_2$ and graphite although alternative inorganic colorants may also be employed depending on manufacturer's preference. The inventors noted that graphite, besides being a colorant, helps to improve mechanical strength of the coating.

To obtain a good adhesion between the metallic basis and the coating, it is highly desirable to carry out a surface treatment of the iron sole plate prior to coating. In a preferred embodiment it is subjected to sand blasting using glass sand or stainless steel grains. Then the surface can be cleaned from residues.

Sand blasting step has also an additional visual effect on the final product. The level of roughness depending on sandblasting material choice e.g. quartz sand, stainless steel balls and alumina adds variable optical effects on the surface. Afterwards, the surface is to be cleaned using solvents of gradual polarity chosen from e.g. water, ethanol and acetone, and then dried.

After cleaning the surface from residues, it is ready to be coated with the solution intended to form the abrasion-resistant and easy-to-clean organic polymer film. A mixture of methyl triethoxy silane (MTEOS), tetraethoxy silane (TEOS) and the metal precursor are mixed and heat treated for carrying out the hydrolysis and polycondensation reactions. The reactions are preferably base catalyzed with an alkali hydroxide as mentioned above. The reaction medium may further comprise an alcohol. In a preferred embodiment, where the alkali hydroxide is KOH and metal precursor is CsOH, the resulting composite coating is expected to have an empirical formula of $K_xCs_ySi_z$, where x, y and z will depend on the stoichiometric amounts of the reactants and catalyst.

In the preferred embodiment mentioned above, the sol of the coating mixture preferably comprises the following components in defined amounts based on the total weight of the mixture:

| | |
|---|---|
| MTEOS | 20-35 wt % |
| TEOS | 4-12 wt % |

-continued

| KOH | 0.1-3 wt % |
| --- | --- |
| CsOH | 0.5-4 wt % |
| Methoxypropanol (PMOH) | 40-60 wt % |
| Pure water | Complementary amount |

The preferable molar proportions between MTEOS:TEOS, KOH:CsOH and water:PMOH can be, for instance about 4:1, 1:2 and 1:3, respectively.

The mixture may also contain alkoxides of sodium, lithium, titanium, cerium, manganese, neodymium, praseodymium, promethium or samarium as initiation agents in mass percentages of 0.01-0.1%, preferably 0.03-0.08%, more preferably 0.05-0.07% mixed with chelat ligands e.g. acetyl acetone or ethyl acetate in molar ratios in the range of 1:1-1:3.

The preparation of Sol is preferably as follows: non-aqueous (solid) pellets of bases are added into the mixture of siloxanes and stirring continues until the solids completely dissolve in the liquid phase. Afterwards, the solution of PMOH in pure water is added dropwise into the solution whilst the temperature in the container is forced not to exceed the room temperature. It is possible to adjust the color and opacity of the mixture which will turn into transparent in its nature when finalized, by addition of graphite and titanium dioxide as colorants in several ratios amongst each other. These optional colorants can now be added to the mixture by up to 15 wt % with respect to total solid matters. Mechanical stirring and ultrasonic bath could be used successively for acquiring a proper dispersion of colorants in the liquid mixture.

This solution can be applied directly onto the sandblasted and cleaned metal sole plate surface, which is an important cost drop not to requiring an additional interlayer. The solution can be applied onto the metallic surface by any convenient method e.g. brushing dip coating, spin coating, casting, and preferably using spray coating. Spray coating allows an overall homogeneous thickness of final solid coating layer. The wet thickness of the coating should preferably be between 1-10 μm, wherein preferable wet thickness is about 3-4 μm.

The coated wet sole plate is then preferably subjected to a partial drying at temperatures clearly below the boiling point of water, e.g. at 75° C. Afterwards the heat treatment starts in a furnace, which is operated at 300-500° C., preferably at 350-400° C. The furnace may also be operated with a temperature-programming, which provides a gradual temperature rise ending at said temperature interval. Since the condensation requires water in the reaction media, the furnace humidity should be kept around saturation in order to avoid evaporation losses from the surface. After a period of 17-20 minutes, the subject may be removed from the furnace to cool back to the ambient temperature.

Because thick brittle films are likely to crack during or after the heat treatment because of the inner tensions rising along the matrix, preferably a very thin dry film with the thickness of 1-10 μm, preferably 2-4 μm can be arranged in order to reduce this risk. Such a low thickness also provides high heat transmittance.

This coating provides a high mechanical and abrasive resistance, and low friction factor.

The technical effects achieved through the invention are demonstrated in the following comparative examples. Preparation of an iron sole plate according to a preferred embodiment of the invention is also explained in Example 1.

Example 1

Preparation of the Iron Sole Plate

A sol comprising the following components is mixed about 12 hrs.

| MTEOS | 44.50 g |
| --- | --- |
| TEOS | 13.06 g |
| KOH | 1.12 g |
| CsOH | 3.5 g |

1.07 g $H_2O$/15 g PMOH

Figure 2:
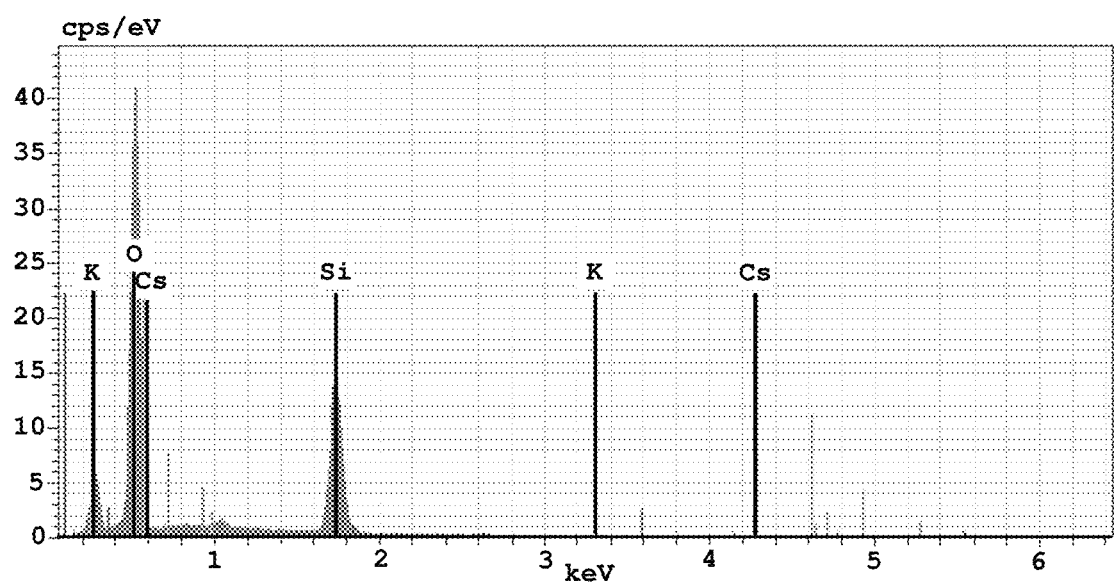
FIG. 2 shows an EDX analysis of the coating applied on an iron sole plate according to the present invention.

Then, 1.01 g $TiO_2$ and 0.34 g graphite were added and the mixture was stirred for an additional couple of hours. The mixture is applied to a preprepared iron sole plate made of stainless steel which is sand blasted, by way of spray coating. The coated sole plate was then furnaced in an oven set to a temperature of 400° C. with gradual heating. The obtained coating was analyzed with Energy-dispersive X-ray spectroscopy (EDX), and elemental composition of the sample was consisting of K, Cs and Si along with some oxides as expected. The analysis is shown in FIG. 2.

Example 2

Abrasion Tests

A sample of iron sole plate prepared according to Example 1 was treated with an abrasion test equipment (Elcometer 1720 washability abrasion tester) applying 1.2 kg pressure with Scotch Brite (ASTM D4213) at 50 rpm and 10.000 revolutions in total. Slightly visible scratches were observed without visible exfoliations of coating.

A sample of the sole plate as tested for abrasion properties was inspected with a Scanning Electron Microscope. The SEM views at various magnifications are shown in FIGS. 3a, 3b, 3c and 3d.

Figure 3A:
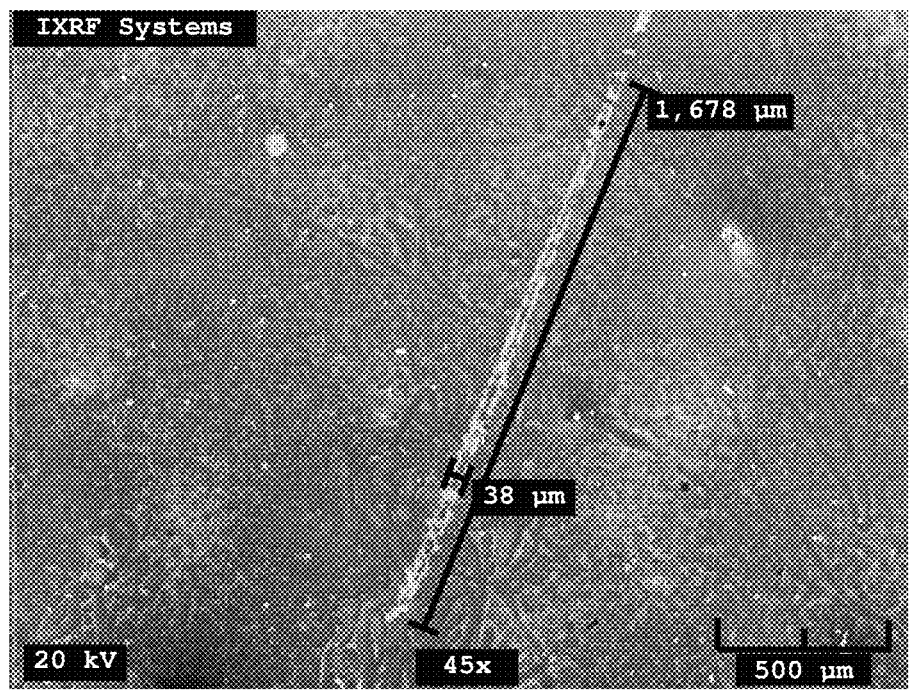
FIGS. 3a, 3b, 3c and 3d show SEM micrographs with various magnifications of a section of the coated iron sole plate that is treated with an abrasion test.

FIG. 3a shows a scratch at 45× magnification, that is occurred in the abrasion test. Length and width of the scratch were about 1678 μm and 38 μm respectively. The scratch was hardly visible with naked eye.

Figure 3B:
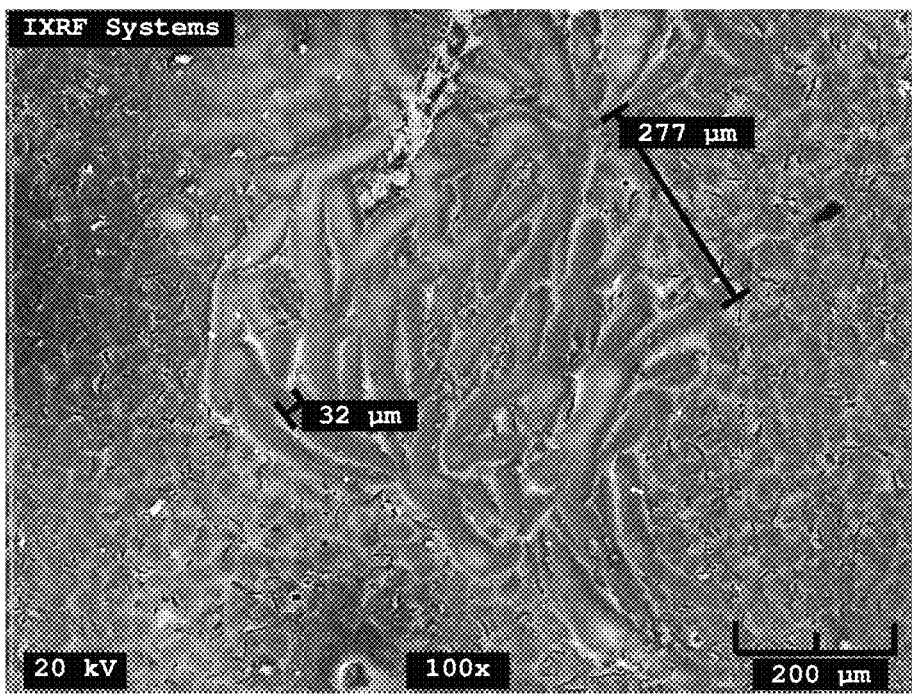

FIG. 3b shows another scratch section on the sample at 100× magnification. Wide wearing on the surface was not observed, but instead small local deformations occurred proving that the coat was very compatible with stainless steel base material and it was also sufficiently homogen along the surface of said base material.

Figure 3C:
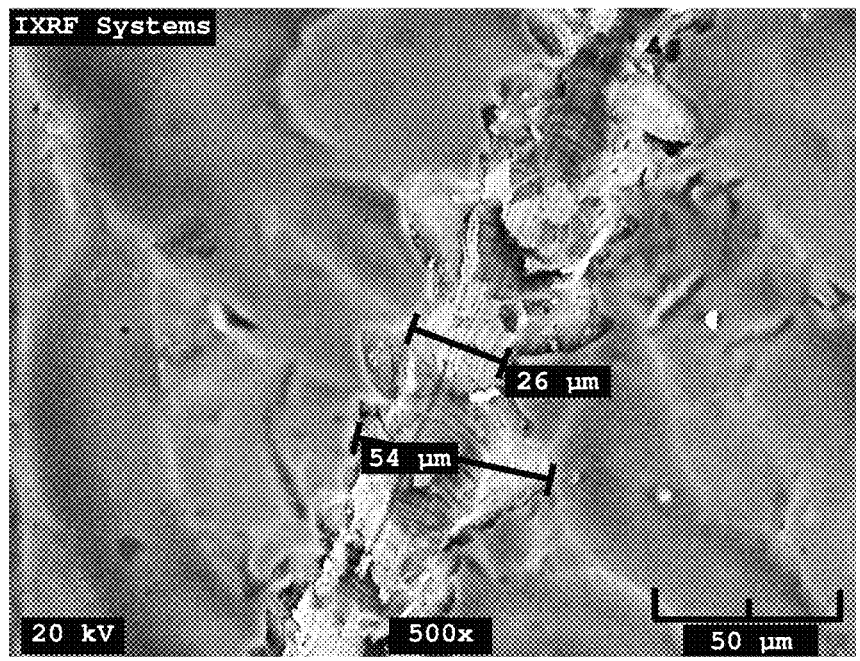

FIG. 3c shows a further detail in a scratch section of the sample at 500× magnification. With this closer look, it is noted that the scratches do not reach through the base material, but are in fact slight exfoliations leaving behind still a coating layer. The exfoliation in the selected section was having a width of 54 μm while, in some sections, it was narrowing to about 26 μm.

Figure 3D:
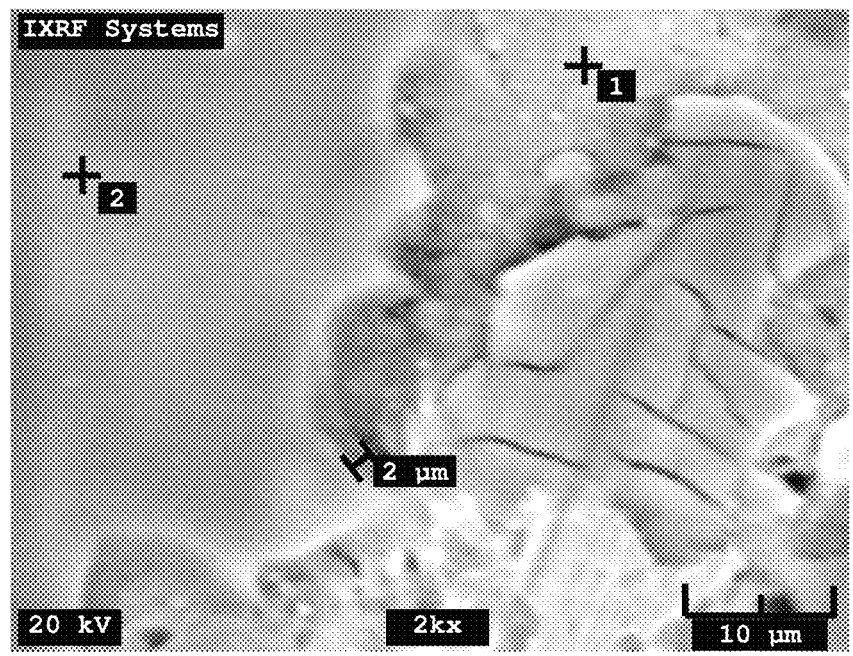

FIG. 3d shows part of the scratch as shown in FIG. 3c at 2000× magnification. It is observed in the figure that coating still adheres to the base material although exfoliations were occurred during severe abrasion treatment.

Comparative Examples

A. Sticking & Cleaning Tests

An iron (Arcelik®) was tested with different sole plates wherein the sole plates are brought into contact with loundry starch and sole plates are allowed to be sticked with the same. Results are given below in Table I.

TABLE I

| SOLE PLATE | Laundry starch (Cleaning) |
|---|---|
| Al—TiN coated | Hard to clean |
| Stainless steel | Easy to clean |
| Nanoglass coated (Example I) | Easy to clean |

B. Fabric Shining Tests

Various irons with different sole plates as commercially available in the market are tested for their detrimental cause to shining in ironed fabrics after several ironings. Each ironing was made by 25 repetitive back and forth movements of the iron on specified wearings. After the ironing procedure, each kind of fabric was graded with a definition among "no shining", "very little shining", "little shining" "shining" and "extremely shining". Results are given below in Table II.

TABLE II

| CONDITIONS | | Teflon ® | Ceramic | Nanoglass (Example I) | Al—TiN |
|---|---|---|---|---|---|
| Average Temp (° C.) | | 194 | 192.5 | 196 | 198.5 |
| Weight of the iron (g) | | 1854 | 1931 | 2144 | 1886.6 |
| Black pants fabric | 25 ironing | No shining | Very little shining | Very little shining | Very little shining |
| | 50- ironing | Very little shining | Little shining | Very little shining | Extremely shining |
| Corduroy fabric | 25 ironing | Very little shining | Sticking | Very little shining | Extremely shining |
| | 50- ironing | Very little shining | Sticking | Very little shining | Extremely shining |
| Grey pants fabric | 25 ironing | Little shining | Shining | Very little shining | Extremely shining |
| | 50- ironing | Little shining | Extremely shining | Very little shining | Extremely shining |
| Cashmere | 25 ironing | Little shining | Extremely shining | Very little shining | Extremely shining |
| | 50- ironing | Little shining | Extremely shining | Very little shining | Extremely shining |

C. Friction Tests

An iron adapted with the iron sole plate as prepared in Example 1 was tested and compared with irons having conventional coatings, i.e. Al—TiN and stainless steel. Each iron was placed on an inclined surface at average heated temperatures thereof, and the minimum angle of start of sliding on the surface was noted for said each iron. The results are shown in Table III.

TABLE III

| CONDITIONS | | Al—TiN | Stainless Steel | Nanoglass (Example I) |
|---|---|---|---|---|
| Average Temp (° C.) | | 178 | 191.5 | 186.5 |
| Weight of the iron (g) | | 1538.6 | 1518.1 | 1504.9 |
| Angle of sliding | With stream | 13' | 16' | 9' |
| | Without stream | 14' | 19' | 10' |

Results & Discussions

An iron sole plate as prepared according to the procedure of Example 1 was adapted to conventional household irons and subjected to the tests as alluded in the foregoing examples. Irons with conventional coatings were also tested for comparative purposes. To summarize the results, the iron base material was found to be very resistant to abrasions even under severe conditions causing scratches without total loss of coating. It was also observed that easy-to-clean properties of the material were quite satisfactory. On the other hand the coating as tested with various kinds of fabrics had notable performance as compared to other coatings in terms of detrimental effects to the fabric (i.e. causing shining). This performance was even better than Teflon®. It was further observed that friction properties of the iron sole plate were considerably improved as demonstrated in the self sliding test (Table III). As a conclusive result, the coating according to the present invention has excellent performance with not only with aluminum base materials, but also with stainless steel unlike the conventional coatings which are hydrolysis and polycondensation products.

The invention claimed is:

1. An iron sole plate comprising a metallic base material having an ironing surface, and a coating layer covering said ironing surface characterized in that said coating is a hydrolysis and polycondensation product of a composition comprising the following:
    methyl triethoxy silane (MTEOS),
    tetraethoxy silane (TEOS),
    an alkoxide or hydroxide of Cesium,
    an alkali hydroxide, and
    water.

2. An iron sole plate according to claim 1, wherein coating composition further comprises an alcohol.

3. The iron sole plate according to claim 2 wherein the coating composition further comprises methoxypropanol (PMOH).

4. An iron sole plate according to the claim 3, wherein sol of the composition comprises the following (w/w):

| MTEOS | 20-35% |
|---|---|
| TEOS | 4-12% |
| KOH | 0.1-3% |
| CsOH | 0.5-4% |
| Methoxypropanol (PMOH) | 40-60% |
| Pure water | Complementary amount. |

5. An iron sole plate according to claim 4, wherein coating composition further comprises a colorant selected from titanium and graphite.

6. An iron sole plate according to claim 5, wherein the colorant is graphite.

7. An iron sole plate according to claim 1, wherein coating composition further comprises a colorant selected from titanium and graphite.

8. An iron sole plate according to claim 7, wherein the colorant is graphite.

9. An iron comprising the iron sole plate according to claim 1.

10. A method for producing an iron sole plate, comprising the steps of:
- providing a metallic base material in the form of an iron sole plate having a flat ironing surface,
- mixing and stirring of a sol composition comprising methyl triethoxy silane (MTEOS), tetraethoxy silane (TEOS), and an alkoxide or hydroxide of Cesium as a metal precursor in an aqueous medium,
- polycondensation of the composition by heat treatment on said ironing surface of the iron sole plate.

11. A method according to claim 10 wherein the heat treatment is carried out in a furnace operated at a temperature ranging from 300 to 500° C. with gradual heating.

12. A method according to claim 10 wherein the metal precursor is CsOH.

13. A method according to claim 12, wherein the composition further comprises potassium hydroxide (KOH) and methoxypropanol (PMOH), and the sol composition comprises the following (w/w):

| | |
|---|---|
| MTEOS | 20-35% |
| TEOS | 4-12% |
| KOH | 0.1-3% |
| CsOH | 0.5-4% |
| Methoxypropanol (PMOH) | 40-60% |
| Pure water | Complementary amount. |

14. A method according to claim 13, wherein the sol composition further comprises a colorant selected from titanium and graphite.

15. A method according to claim 10, wherein the mixing and stirring step further comprises addition of an alkali hydroxide.

16. The method according to claim 15, wherein the mixing and stirring step further comprises addition of KOH.

17. The method according to claim 10 wherein sol composition further comprises an alcohol.

18. The method according to claim 17, wherein the sol composition comprises methoxypropanol (PMOH).

19. A method according to claim 10, wherein the sol composition further comprises a colorant selected from titanium and graphite.

* * * * *